United States Patent
An

(10) Patent No.: US 9,596,232 B2
(45) Date of Patent: *Mar. 14, 2017

(54) MANAGING SHARING OF WIRELESS NETWORK LOGIN PASSWORDS

(71) Applicant: Alibaba Group Holding Limited, George Town (KY)

(72) Inventor: Bingchun An, Beijing (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/993,535

(22) Filed: Jan. 12, 2016

(65) Prior Publication Data
US 2016/0205087 A1  Jul. 14, 2016

Related U.S. Application Data

(63) Continuation of application No. 14/497,042, filed on Sep. 25, 2014, now Pat. No. 9,270,669.

(30) Foreign Application Priority Data

Sep. 29, 2013  (CN) .......................... 2013 1 0455904

(51) Int. Cl.
*G06F 7/04* (2006.01)
*H04L 29/06* (2006.01)
(Continued)

(52) U.S. Cl.
CPC ............ *H04L 63/083* (2013.01); *H04L 63/10* (2013.01); *H04L 63/102* (2013.01); *H04W 12/06* (2013.01); *H04W 12/08* (2013.01); *H04W 84/12* (2013.01)

(58) Field of Classification Search
CPC ...... H04L 63/083; H04L 63/10; H04W 12/08; H04W 84/12
(Continued)

(56) References Cited

U.S. PATENT DOCUMENTS 8,509,767 B2   8/2013 Parsons et al.
8,813,198 B2   8/2014 Louboutin et al.
(Continued)

FOREIGN PATENT DOCUMENTS

WO   2012122995 A1   9/2012

OTHER PUBLICATIONS

Jonathan Munizaga, 'WiFi Map Pro: Find password Wi-Fi public places,' Wayerless.com, Oct. 18, 2012. Originally retrieved in Spanish on Nov. 28, 2014. Machine Translated by Chrome web browser. URL https://www.wayerless.com/2012/10/wifi-map-pro-averigua-la-contrasena-wi-fi-de-lugares-publicos/.

*Primary Examiner* — Teshome Hailu
(74) *Attorney, Agent, or Firm* — Van Pelt, Yi & James LLP

(57) ABSTRACT

Managing sharing of wireless network login passwords is disclosed, including: receiving from a terminal an authentication request to authenticate a wireless network, wherein the authentication request includes a first identifying information; sending an authentication code to the terminal, wherein the authentication code is to be configured as a newly configured login password associated with the wireless network; receiving a feedback response from the terminal, wherein the feedback response includes a second identifying information and the newly configured login password associated with the wireless network; in the event that the first identifying information matches the second identifying information and the authentication code matches the newly configured login password, determining that the terminal is an administrative terminal associated with the wireless network; and storing at least one of the first identifying information and the second identifying information as authentication identifying information with the newly configured login password.

16 Claims, 6 Drawing Sheets

(51) Int. Cl.
*H04W 12/06* (2009.01)
*H04W 12/08* (2009.01)
*H04W 84/12* (2009.01)

(58) Field of Classification Search
USPC .............................................. 726/4
See application file for complete search history.

(56) References Cited

U.S. PATENT DOCUMENTS

| | | | |
|---|---|---|---|
| 9,047,759 B2* | 6/2015 | Yamada | G08C 17/02 |
| 9,142,122 B2* | 9/2015 | Oshima | G08C 17/02 |
| 2005/0135624 A1* | 6/2005 | Tsai | H04L 9/321 |
| | | | 380/270 |
| 2005/0138355 A1* | 6/2005 | Chen | H04L 63/08 |
| | | | 713/155 |
| 2008/0195741 A1 | 8/2008 | Wynn et al. | |
| 2011/0072493 A1* | 3/2011 | Morishita | G06F 21/31 |
| | | | 726/3 |
| 2012/0036557 A1 | 2/2012 | Li | |
| 2012/0330769 A1* | 12/2012 | Arceo | G06Q 20/4014 |
| | | | 705/21 |
| 2013/0247117 A1* | 9/2013 | Yamada | G08C 17/02 |
| | | | 725/93 |
| 2013/0331083 A1 | 12/2013 | Oslund | |
| 2014/0009268 A1* | 1/2014 | Oshima | G08C 17/02 |
| | | | 340/12.5 |
| 2014/0026192 A1 | 1/2014 | Gatewood et al. | |

* cited by examiner

MANAGING SHARING OF WIRELESS NETWORK LOGIN PASSWORDS

CROSS REFERENCE TO OTHER APPLICATIONS

This application is a continuation of co-pending U.S. patent application Ser. No. 14/497,042, entitled MANAGING SHARING OF WIRELESS NETWORK LOGIN PASSWORDS filed Sep. 25, 2014 which is incorporated herein by reference for all purposes, which claims priority to People's Republic of China Patent Application No. 201310455904.9 entitled A METHOD, SERVER, AND SYSTEM FOR MANAGING A WIRELESS NETWORK LOGIN PASSWORD SHARING FUNCTION, filed Sep. 29, 2013 which is incorporated herein by reference for all purposes.

FIELD OF THE INVENTION

The present application relates to the field of online information processing. Specifically, the present application relates to techniques for managing the sharing of wireless network login passwords.

BACKGROUND OF THE INVENTION

The process of going online with WiFi (Wireless Fidelity) consists of converting wired network signals into wireless signals and supplying them to terminals that are WiFi-enabled such as computers, cell phones, and PDA, for example. If a mobile terminal (e.g., a cell phone) has a WiFi function, the mobile terminal can go online without going through a mobile data communications network when WiFi wireless signals are present and thus avoid being charged network use fees. WiFi connections are provided by wired networks, such as home ADSL and small area broadband. Many restaurants, café s, and other establishments now provide their customers with WiFi service.

A function for sharing the local WiFi password has been added to some conventional devices and/or operating systems executing on such devices. After obtaining the WiFi password for a public network, a user can select a selectable element displayed in a user interface displayed in one of such devices to upload the WiFi password via an application installed on the device to a server such that the WiFi password can be shared with other users. After the other users download the WiFi password from the server onto their respective devices, these other users can directly connect to the WiFi network without having to obtain or manually input the password of that WiFi network. The WiFi sharing scheme of these conventional devices and/or operating systems allow the sharing of the password of a local WiFi network to be very convenient.

However, there are serious security defects in allowing any user who has obtained the WiFi password to freely share it with other users. For instance, conventionally, anyone can perform WiFi password sharing without the permission of the owner of the WiFi network (e.g., the café owner associated with providing the WiFi network at his or her business). Although the owner of a WiFi network may not wish to share the WiFi password of his own wireless network freely with any user, as soon as a user obtains the WiFi account password, he may share it with others without the knowledge or permission of the WiFi network owner.

Existing schemes impose no restrictions on the parties that may activate wireless network WiFi password sharing functions. As such, anyone may activate the password sharing function of the wireless network that is administered by another person, which may cause security breaches.

BRIEF DESCRIPTION OF THE DRAWINGS

Various embodiments of the invention are disclosed in the following detailed description and the accompanying drawings.

DETAILED DESCRIPTION

Figure 1:
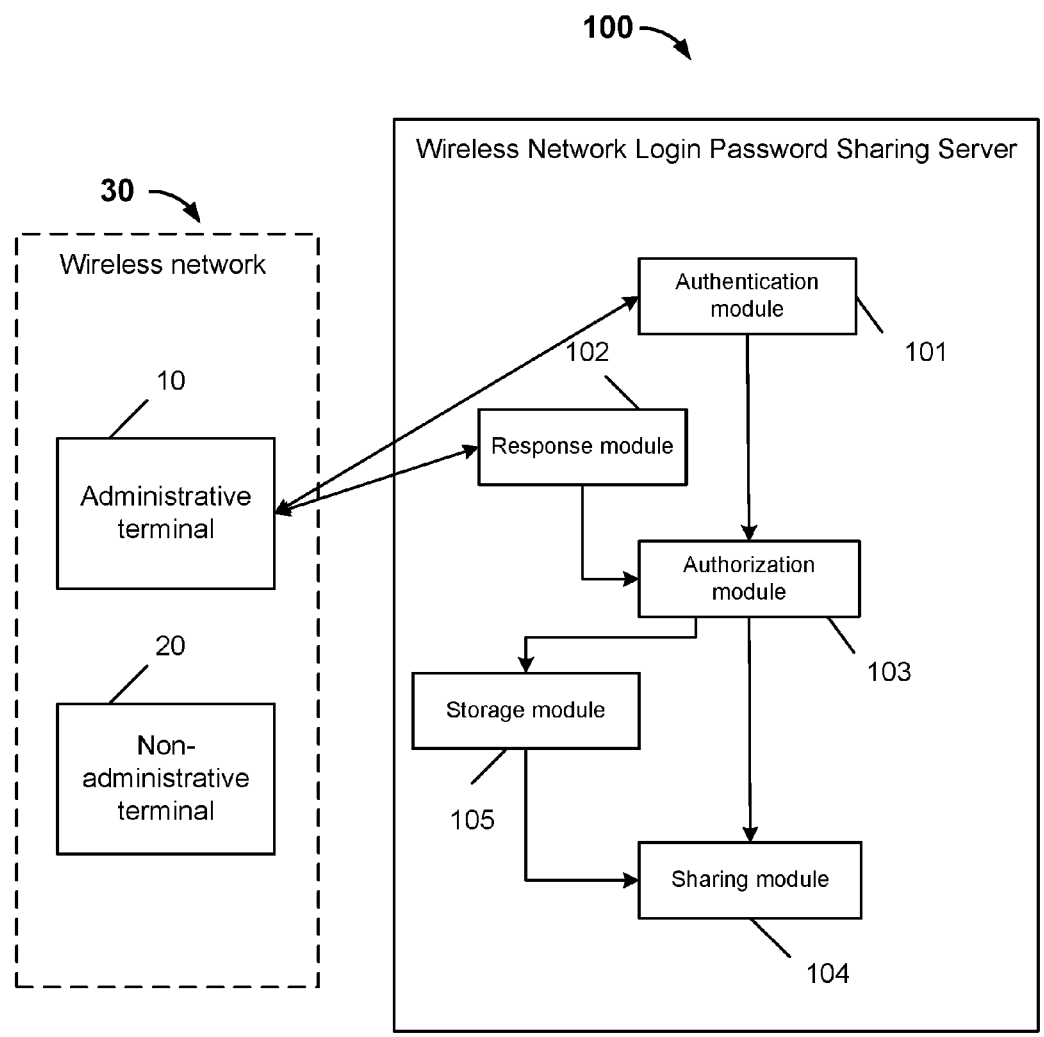
FIG. 1 is a diagram showing an embodiment of a system for managing sharing of wireless network login passwords.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of managing sharing of wireless network login passwords are described herein. In various embodiments, a "wireless network" is a password protected wireless network, meaning that the wireless network requires a terminal to provide the correct login password before the terminal is permitted to log in to the network. In various embodiments, a wireless network comprises a WiFi network. In various embodiments, an "administrative terminal" with respect to a wireless network comprises a terminal that is used by an administrative user of the wireless network. Put another way, an administrative user can be the owner of the wireless network or a user who can otherwise control whether the login password of the wireless network can be shared with non-administrative, guest users. The administrative terminal can be used to authorize a (e.g., remote or local) wireless network login password sharing server to share the login password of that wireless network with non-administrative, guest users. For example, the administrative terminal may comprise a smart phone, a tablet device, a device associated with a wireless router, and/or any computing device. In some embodiments, the administrative user of the wireless network comprises a user with administrative credentials usable to modify the login password of the wireless network. A non-administrative or "guest" user comprises a user who does not have such administrative credentials and as such, a terminal used by a non-administrative user is referred to as a "non-administrative terminal" because the user of such a terminal lacks the credentials needed to modify the login password of the wireless network. Nevertheless, while a non-administrative/guest terminal cannot modify the login password of the wireless network, the non-administrative/guest terminal may still request the server to share with it the login password of the wireless network so that the non-administrative terminal can log in to the wireless network.

To authorize the login password of a wireless network to be shared with non-administrative/guest terminals, an administrative terminal sends an authentication request to a wireless network login password sharing server. In the event that the wireless network login password sharing server can confirm that the terminal that sent the authentication request comprises an administrative terminal with respect to the wireless network identified in the authentication request, then the wireless network login password sharing server will determine that the wireless network is authenticated by the administrative terminal and that the server has now been authorized to share the login password of the now authenticated wireless network with non-administrative/guest terminals. The wireless network login password sharing server stores identifying information and the login password associated with the authenticated wireless network. However, in the event that the wireless network login password sharing server cannot confirm that the terminal that sent the authentication request comprises an administrative terminal with respect to the wireless network identified in the authentication request, then the wireless network login password sharing server determines that the terminal is a non-administrative/guest terminal and that the server has not been authorized to share the login password of the unauthenticated wireless network with non-administrative/guest terminals. As such, only terminals used by administrative users (e.g., users who have credentials needed to modify the login password of the wireless network) are allowed to authorize the wireless network login password sharing server to share the login passwords of the wireless networks with non-administrative/guest users. Terminals used by non-administrative/guest users will not be able to authorize the wireless network login password sharing server to share the login passwords of the wireless networks with other non-administrative/guest users.

When a non-administrative or guest user desires to gain access to an authenticated wireless network (e.g., a wireless network for which the login password has been authorized to be shared by the wireless network login password sharing server), the non-administrative/guest user uses a terminal to send a sharing request for the login password of a nearby authenticated wireless network. The wireless network login password sharing server will determine a nearby authenticated wireless network and send to the non-administrative/guest terminal that sent the sharing request the login password of the determined nearby authenticated wireless network. The non-administrative/guest terminal that received the login password can use that login password to log in to the authenticated wireless network to gain access to perform online operations, as will be described in further detail below.

FIG. 1 is a diagram showing an embodiment of a system for managing sharing of wireless network login passwords.

In the example of FIG. 1, wireless network login password sharing server 100 includes authentication module 101, response module 102, authorization module 103, sharing module 104, and storing module 105.

The modules can be implemented as software components executing on one or more processors, as hardware such as programmable logic devices, and/or Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices.

An administrative user using administrative terminal 10 is responsible for managing wireless network 30. Wireless network 30 was set up using a wireless router (not shown in the diagram). The administrative user knows the current login password, if one has already been set, for wireless network 30 and is also currently logged onto wireless network 30. The administrative user also knows the administrative credentials needed to modify the login password of wireless network 30. In various embodiments, administrative credentials usable by an administrative user to modify the login password of wireless network 30 are a different set of credentials (e.g., password) than those needed by a terminal to connect to wireless network 30. The administrative user would like to authorize the sharing of the login password of wireless network 30 with non-administrative/guest terminals and so, in some embodiments, uses an application executing at administrative terminal 10 to send an authentication request, including a first identifying information of wireless network 30, to remote wireless network login password sharing server 100 over wireless network 30.

Authentication module 101 of wireless network login password sharing server 100 is in communication with administrative terminal 10 and is configured to receive the authentication request sent from administrative terminal 10 over wireless network 30. Then, authentication module 101 is configured to extract the first identifying information for wireless network 30 from the authentication request. Authentication module 101 is configured to generate an authentication code to send back to administrative terminal 10 so that if administrative terminal 10 is an administrative terminal used by an administrative user, the administrative user of administrative terminal 10 has the required credentials to configure the login password for wireless network 30 used by administrative terminal 10 to be the authentication code.

Upon receiving the authentication code, in various embodiments, administrative terminal 10 displays the authentication code for the administrative user and for example, instructions to set the authentication code as the new login password of wireless network 30. The administrative user then uses the needed credentials to change the login password of wireless network 30 (e.g., via a user interface associated with the wireless router associated with wireless network 30) to match the authentication code. Once the login password has been changed to match the authentication code, administrative terminal 10 is configured to send a feedback response, including the newly configured login password of wireless network 30 and a second identifying information of wireless network 30, to wireless network login password sharing server 100 over wireless network 30.

Response module 102 of wireless network login password sharing server 100 is in communication with administrative terminal 10 and is configured to receive the feedback response sent by administrative terminal 10 over wireless network 30. Response module 102 is configured to extract the second identifying information and the newly configured login password for wireless network 30 from the feedback response.

Authorization module 103 of wireless network login password sharing server 100 is coupled separately to authentication module 101 and response module 102 and is configured to compare the first identifying information extracted by authentication module 101 to the second identifying information extracted by response module 102. Authorization module 103 is further configured to compare the newly configured login password extracted by response module 102 to the authentication code generated by authentication module 101.

In the event that authorization module 103 determines both that the first identifying information matches the second identifying information and that the newly configured login password matches the authentication code, authorization module 103 determines that administrative terminal 10 comprises an administrative terminal with respect to wireless network 30 and that administrative terminal 10 has also authenticated wireless network 30.

Sharing module 104 of wireless network login password sharing server 100 is coupled to authorization module 103 and is configured to receive a sharing authorization notification from authorization module 103 in the event that wireless network 30 was authenticated by administrative terminal 10 (if administrative terminal 10 was determined to be an administrative terminal) such that the login password of wireless network 30 may be shared with requesting non-administrative/guest terminals.

Storage module 105 of wireless network login password sharing server 100 is coupled separately to authorization module 103 and sharing module 104. Storage module 105 is configured to receive a sharing authorization notification from authorization module 103, after authorization module 103 confirms that administrative terminal 10 is an administrative terminal for wireless network 30. The sharing authorization notification at storage module 105 causes storage module 105 to store the first identifying information and/or second identifying information of wireless network 30 as authentication identifying information and also the login password of wireless network 30 with the authentication identifying information.

Sometime after wireless network 30 has been authenticated by wireless network login password sharing server 100, a guest user associated with non-administrative terminal 20, (who does not have the current login password of wireless network 30 and therefore cannot use wireless network 30) decides to request for the password of a nearby authenticated wireless network. Therefore, the guest user of non-administrative terminal 20 can use an application executing on non-administrative terminal 20 to send a sharing request, including identifying information of nearby wireless networks (including wireless network 30), to wireless network login password sharing server 100 over a mobile data network (e.g., a telecommunication network such as a 3G network or LTE network) since non-administrative terminal 20 cannot yet connect to wireless network 30.

Due to having previously received the sharing authorization notification from authorization module 103, sharing module 104 responds to the sharing request submitted by non-administrative terminal 20 for wireless network 30 authenticated by the administrative terminal, administrative terminal 10, and shares with non-administrative terminal 20 the login password for wireless network 30 authenticated by the administrative terminal, administrative terminal 10.

Sharing module 104 is configured to receive a notification from authorization module 103 to respond to the sharing request submitted by non-administrative terminal 20. Sharing module 104 extracts from the sharing request the identifying information for one or more wireless networks providing service around the current geographic location of non-administrative terminal 20. The one or more wireless networks providing service around the current geographic location of non-administrative terminal 20 may be detected by non-administrative terminal 20. Sharing module 104 is configured to compare the identifying information of the one or more wireless networks extracted from the sharing request with the authentication identifying information stored in storage module 105. Storage module 105 obtains the saved login password corresponding to an authentication identifying information that matches the identifying information of one of the wireless networks extracted from the sharing request and sends to non-administrative terminal 20 the identifying information and the login password for wireless network 30 corresponding to the authentication identifying information.

In the event that authorization module 101 had determined that the first identifying information and the second identifying information were different and/or that the newly configured login password and the authentication code were different, authorization module 103 would have determined that administrative terminal 10 is not an administrative terminal of wireless network 30. If administrative terminal 10 was determined not to be an administrative terminal of wireless network 30, sharing module 104 would have received a sharing disabling notification from authorization module 103. After confirming that administrative terminal 10 is not an administrative terminal for wireless network 30 based on the sharing disabling notification, sharing module 104 would have been configured to refuse the sharing request submitted by non-administrative terminal 20 for the login password to wireless network 30 and therefore, sharing module 104 would not have shared the login password of wireless network 30 with non-administrative terminal 20.

Figure 2:
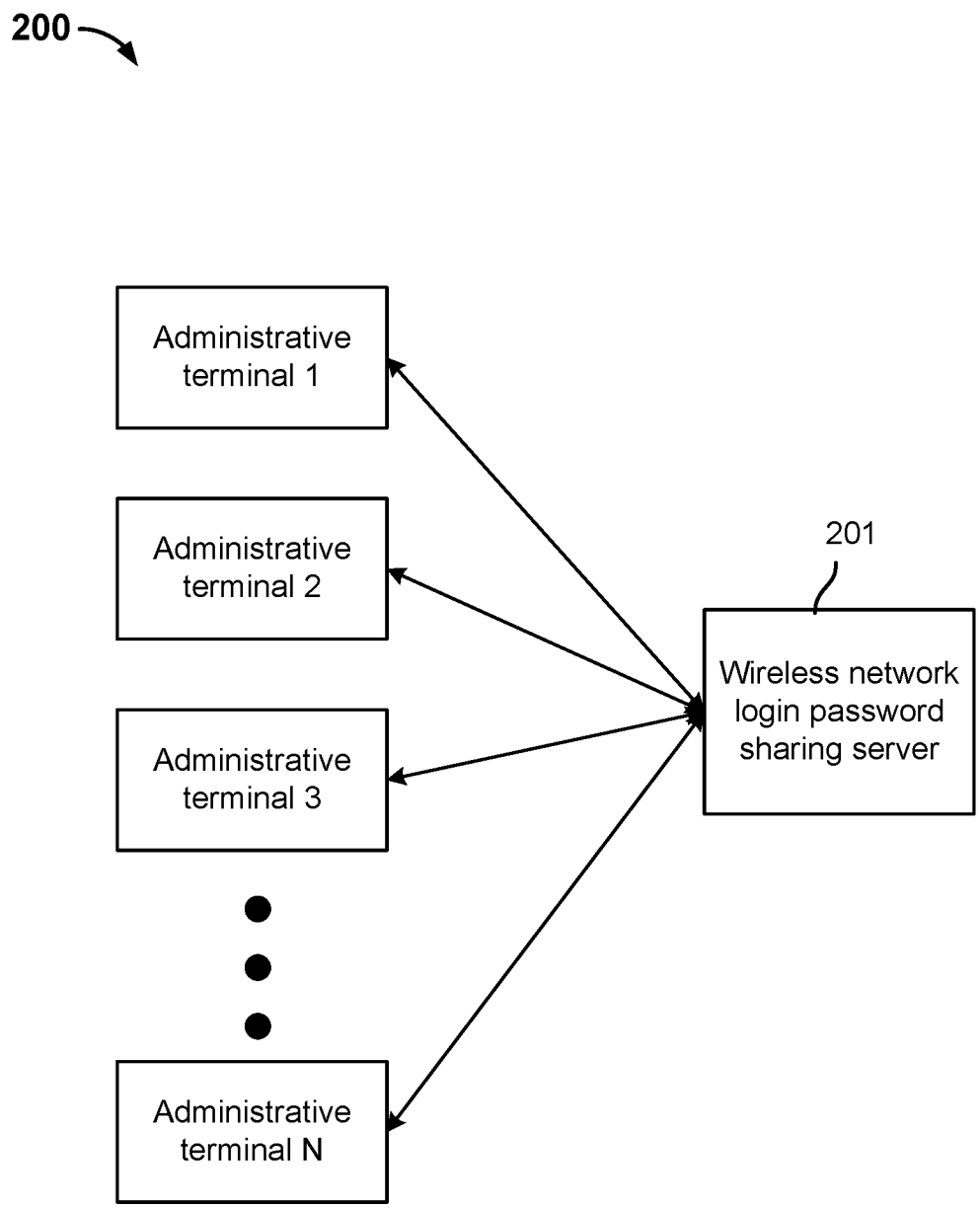
FIG. 2 is a diagram showing an embodiment of a system for managing sharing of wireless network login passwords.

FIG. 2 is a diagram showing an embodiment of a system for managing sharing of wireless network login passwords.

In the example of FIG. 2, system 200 includes wireless network login password sharing server 201 and administrative terminals 1 through N. Each terminal of administrative terminals 1 through N is currently logged on to a respective wireless network (not shown in the diagram) and is an administrative terminal by virtue of being used by an administrative user of the respective wireless network. Each wireless network is managed by a respective wireless router (not shown in the diagram).

System 200 illustrates an example where wireless login password sharing server 201 can process an authentication request from each administrative terminal of administrative terminals 1 through N to enable wireless network login password sharing for a wireless network that is currently used by that administrative terminal.

Each administrative terminal of administrative terminals 1 through N is configured to log in to a corresponding wireless network using a previously configured login password for a corresponding wireless network. Each administrative terminal of administrative terminals 1 through N is configured to determine a first identifying information for the corresponding wireless network and send an authentication request that includes the first identifying information to remote wireless network login password sharing server 201 via the corresponding wireless network. In response to the authentication request, each administrative terminal of administrative terminals 1 through N receives a corresponding authentication code sent from wireless network login password sharing server 201. The corresponding administrative user of each administrative terminal of administrative terminals 1 through N is configured to set the authentication code as a newly configured login password for the corresponding wireless network. After the newly configured login password has been set, each administrative terminal of administrative terminals 1 through N is configured automatically to determine a second identifying information for the corresponding wireless network and send a feedback response that includes the second identifying information and the newly configured login password to wireless network login password sharing server 201 via the wireless network. If wireless network login password sharing server 201 determines that the first identifying information matches the second identifying information and that the authentication code matches the newly configured login password, then wireless network login password sharing server 201 determines that the wireless network is authenticated and that sharing of that wireless network's login password with other terminals has been authorized. Wireless network login password sharing server 201 then stores authentication identifying information and the login password corresponding to the wireless network.

Figure 3:
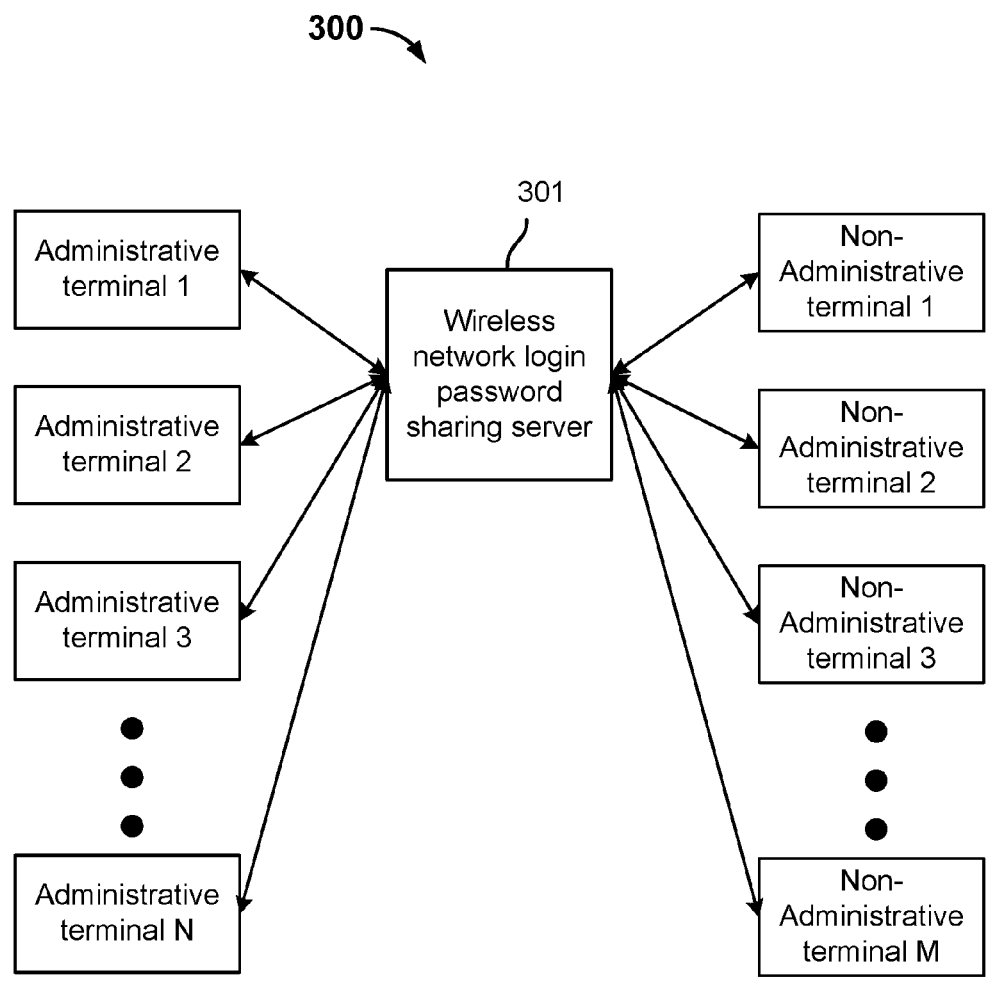
FIG. 3 is a diagram showing an embodiment of a system for managing sharing of wireless network login passwords.

FIG. 3 is a diagram showing an embodiment of a system for managing sharing of wireless network login passwords.

In the example of FIG. 3, system 300 includes wireless network login password sharing server 301, administrative terminals 1 through N, and non-administrative terminals 1 through M. Each terminal of administrative terminals 1 through N is currently logged on to a respective wireless network (not shown in the diagram) and is an administrative terminal by virtue of being used by an administrative user of the respective wireless network. Each wireless network is managed by a respective wireless router (not shown in the diagram).

Each terminal of non-administrative terminals 1 through M is a non-administrative terminal by virtue of being used by a non-administrative user. None of non-administrative terminals 1 through M is connected to a wireless network but may be connected to a non-wireless network (e.g., a mobile data network such as a 3G network).

System 300 illustrates an example where wireless network login password sharing server 301 can process an authentication request from each administrative terminal of administrative terminals 1 through N to enable wireless network login password sharing for a wireless network that is currently used by that administrative terminal. Furthermore, system 300 illustrates an example where wireless network login password sharing server 301 can process a sharing request from each non-administrative terminal of non-administrative terminals 1 through M by potentially sending identifying information and the login password of a wireless network for which wireless network login password sharing has previously been authorized by a corresponding administrative terminal.

Each administrative terminal of administrative terminals 1 through N is configured to log in to the wireless network using a previously configured login password for a corresponding wireless network. Each administrative terminal of administrative terminals 1 through N is configured to determine a first identifying information for the corresponding wireless network and send an authentication request that includes the first identifying information to wireless network login password sharing server 301 via the wireless network. In response to the authentication request, each administrative terminal of administrative terminals 1 through N receives a corresponding authentication code sent from wireless network login password sharing server 301. The corresponding administrative user of each administrative terminal of administrative terminals 1 through N is configured to set the authentication code as a newly configured login password for the corresponding wireless network. After the newly configured login password has been set, each administrative terminal of administrative terminals 1 through N is configured to automatically determine a second identifying information for the corresponding wireless network and send a feedback response that includes the second identifying information and the newly configured login password to wireless network login password sharing server 301 via the wireless network. If wireless network login password sharing server 301 determines that the first identifying information matches the second identifying information and that the authentication code matches the newly configured login password, then wireless network login password sharing server 301 determines that the wireless network is authenticated and that sharing of that wireless network's login password with other terminals has been authorized. Wireless network login password sharing server 301 then stores authentication identifying information and the login password corresponding to the wireless network.

Each non-administrative terminal of non-administrative terminals 1 through M is configured to detect one or more wireless networks that are capable of providing service around its current geographic location. Each non-administrative terminal of non-administrative terminals 1 through M is configured to send a sharing request that includes the identifying information of the detected one or more wireless networks to wireless network login password sharing server 301. In various embodiments, a non-administrative terminal can send a sharing request over a network other than a WiFi network (e.g., a mobile data network such as 3G network). If wireless network login password sharing server 301 determines that there is an authenticated wireless network among the one or more wireless networks for which identifying information was included in the sharing request, wireless network login password sharing server 301 sends the identifying information and a login password for the authenticated wireless network to the non-administrative terminal so that the non-administrative terminal can log in to that wireless network.

Figure 4:
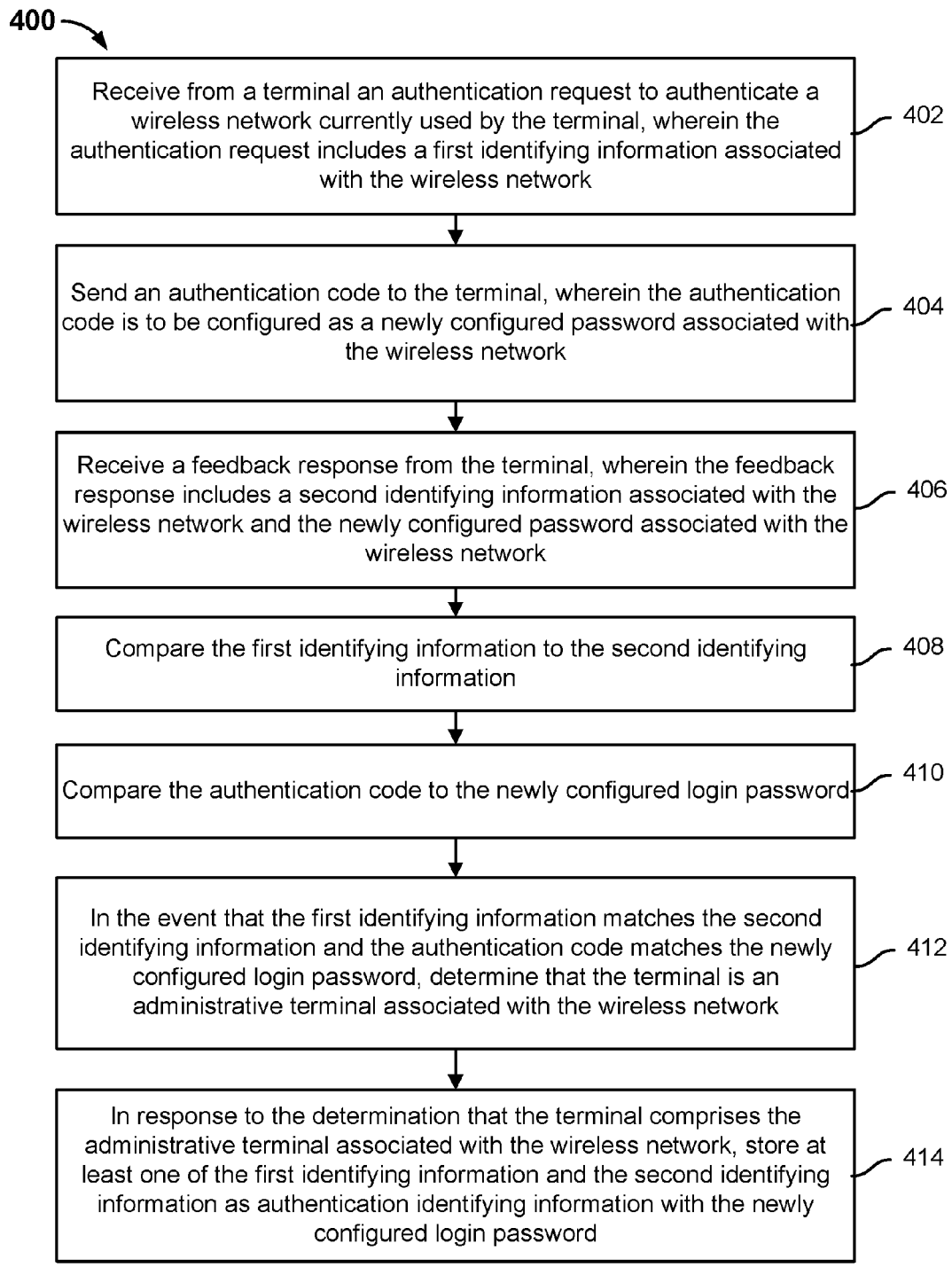
FIG. 4 is a flow diagram showing an embodiment of a process for authenticating a wireless network by an administrative terminal.

FIG. 4 is a flow diagram showing an embodiment of a process for authenticating a wireless network by an administrative terminal. In some embodiments, process 400 is implemented at a wireless network login password sharing server such as wireless network login password sharing server 101 of system 100.

Process 400 describes a process of authenticating a terminal as an administrative terminal and also authenticating a wireless network used by the administrative terminal such that the login password for the authenticated wireless network becomes shareable with non-administrative terminals via a wireless network login password sharing server.

At 402, an authentication request to authenticate a wireless network currently used by a terminal is received from the terminal, wherein the authentication request includes a first identifying information associated with the wireless network.

An administrative user using an administrative terminal that is currently logged in to a wireless network desires to authorize a wireless network login password sharing server to share the login password of the wireless network with requesting non-administrative terminals. As such, the administrative user can open a special wireless network login password sharing application executing at the terminal to input a selection to generate and send an authentication request to a remote wireless network login password sharing server. In some embodiments, the authentication request may be generated by a web browser application executing at the terminal.

The authentication request includes at least a first identifying information associated with the wireless network. In some embodiments, the first identifying information associated with the wireless network that is currently used by the administrative terminal is automatically stored and/or obtained by the administrative terminal. Examples of the first identifying information associated with the wireless network comprise one or more of the following: the name of the wireless network (SSID, Service Set Identifier), the physical location of the wireless router (MAC, Media Access Control) associated with the wireless network, or geographic location information (GPS, Global Positioning System) associated with the wireless network. The authentication request is submitted using the wireless network to which the terminal is currently logged in to ensure that the wireless network submitted for sharing is usable and to avoid a situation where the terminal, i.e., the one submitting the wireless network for sharing, submits a wireless network that cannot be accessed or that does not exist.

In some embodiments, the authentication request may additionally include information associated with the user and/or business information associated with an establishment (e.g., a hotel, a café) with which the wireless network is associated. For example, a business owner can submit an authentication request via a terminal to enable sharing of the login password of a wireless network with visitors of the business establishment.

The first identifying information associated with the wireless network is obtained from the authentication request and can be (temporarily) stored at the wireless network login password sharing server.

At 404, an authentication code is sent to the terminal, wherein the authentication code is to be configured as a newly configured login password associated with the wireless network.

In some embodiments, the authentication code is generated by the wireless network login password sharing server, for example, by the server using a random string generator. The authentication code may comprise a series of random alphanumeric characters and/or symbols. In some embodiments, the authentication code may comprise other formats as well. The authentication code is stored at the server.

As described above, in various embodiments, an administrative terminal comprises a terminal that is used by an administrator user, who is a user with the credentials (e.g., the login name and password) required to manually modify the login password to the wireless network. A non-administrative terminal comprises a terminal that is used by a non-administrator/guest user, who is a user without the credentials (e.g., the login name and password) required to manually modify the login password to the wireless network.

As such, in various embodiments, the authentication code is generated and sent by the server to the terminal that had sent the authentication request. The authentication code is displayed at the terminal for the user. If the user is an administrative user, then the user has the required privilege to change the previously configured login password of the wireless network to the authentication code. For example, to change the previously configured login password of the wireless network to the authentication code, the administrative user could use his or her credentials to access an interface (e.g., via a specially configured application and/or browser application executing at the terminal) at which the login password of the wireless network can be changed and then proceed to change the password of the wireless network to match the authentication code. For example, if a password had been previously configured for the wireless network, then the previously configured login password is replaced by the authentication code as the newly configured login password. For example, if a password had not been previously configured to the wireless network, then the wireless network is configured to be password protected and then the authentication code is set as the newly configured login password. However, if the user is a non-administrative user, then the user will not have the required privilege to change the previously configured login password of the wireless network.

At 406, a feedback response is received from the terminal, wherein the feedback response includes a second identifying information associated with the wireless network and the newly configured login password associated with the wireless network. In some embodiments, the second identifying information associated with the wireless network that is currently used by the administrative terminal is automatically stored and/or obtained by the administrative terminal.

In the event that the user is an administrative user and therefore has the required privilege to change the previously configured login password of the wireless network to the authentication code, then after the password of the wireless network is changed using the terminal, a feedback response is automatically generated and sent by (e.g., the special wireless network login password sharing) the application via the terminal to the server. The feedback response includes a second identifying information associated with the wireless network currently used by the terminal and the newly configured login password of the wireless network. Examples of the second identifying information associated with the wireless network comprise the name of the wireless network (SSID, Service Set Identifier), the physical location of the wireless router (MAC, Media Access Control) associated with the wireless network, or geographic location information (GPS, Global Positioning System) associated with the wireless network. The second identifying information is configured to be in the same format as the first identifying information. For example, if the first identifying information were the SSID of a wireless network, then the second identifying information would also be the SSID of a wireless network. As will be described further below, the first and second identifying information will be compared against each other to confirm that the terminal used the same wireless network to send both the authentication request and also the feedback response.

The first identifying information and the second identifying information of the wireless network that is currently used by the terminal are capable of being collected and reported by the terminal. The process by which the first and/or second identifying information of the wireless network is collected by the terminal cannot easily be interfered with or modified by an ordinary user. As such, the first identifying information and the second identifying information of the wireless network reported by the terminal are assumed to be reliable.

In some embodiments, the feedback response is generated by the application associated with the wireless network login password sharing service in response to a user selection. For example, the application associated with the wireless network login password sharing service may automatically determine the second identifying information associated with the wireless network and the newly configured login password for the wireless network from the wireless network that the terminal is currently using.

In the event that the user of the terminal has been a non-administrative user and therefore did not have the required privilege to change the previously configured login password of the wireless network to the authentication code, then a feedback response may not be sent from the non-administrative terminal to the server and/or if the feedback response is generated, the login password included in the feedback response remains the previously configured login password because the user could not have changed it to the authentication code.

At 408, the first identifying information is compared to the second identifying information.

The second identifying information of the wireless network included in the feedback response is compared to the (previously stored) first identifying information of the wireless network included in the authentication request.

By comparing the first identifying information to the second identifying information, the server can determine whether the wireless network used by the terminal to send the feedback response in step 406 is the same wireless network that was used by the terminal when it had sent the authentication request in step 402. In this way, the following scenario can be prevented: a user uses a first wireless network for which he or she is not an administrative user to send an authentication request and then switches to a second, different wireless network for which he or she is the administrative user, changes the login password for the second wireless network to the authentication code received from the server, and sends a response feedback using the second wireless network to try to fool the server into believing that the user was able to modify the login password of the first wireless network and to effectively attempt to enable the login password sharing feature for someone else's wireless network.

At 410, the authentication code is compared to the newly configured login password.

The authentication code included in the feedback response is compared to the newly configured login password that was previously generated and stored by the server to verify that the user of the terminal is an administrative user who was able to successfully change the login password of the wireless network to the authentication code provided by the server.

At 412, in the event that the first identifying information matches the second identifying information and the newly configured login password matches the authentication code, the terminal is determined to be an administrative terminal associated with the wireless network.

If both the first identifying information matches the second identifying information and the authentication code matches the newly configured login password to the wireless network, then it is confirmed that the terminal that had submitted the authentication request and the feedback response is authenticated as an administrative terminal associated with the wireless network.

If the first identifying information does not match the second identifying information, then it indicates that the terminal used a first wireless network to submit the authentication request but then changed the password of a second, different wireless network, in which case the terminal does not become authenticated as an administrative terminal associated with the first wireless network.

If the authentication code does not match the newly configured login password, then it indicates that the user was not able to modify the login password of the wireless network to match the authentication code (e.g., because the user did not have the requisite credentials), in which case the terminal does not become authenticated as an administrative terminal associated with the wireless network.

Therefore, steps 402 through 412 ensure that an authentication request from a non-administrative terminal (e.g., a terminal used by a user without the credentials required to modify the login password to the wireless network) cannot authenticate the terminal.

At 414, in response to the determination that the terminal comprises the administrative terminal associated with the wireless network, at least one of the first identifying information and the second identifying information is stored as authentication identifying information with the newly configured login password.

After determining that the terminal is an administrative terminal for the wireless network, the server determines that the wireless network is authenticated and therefore, the server is authorized to share the login password for the wireless network with requesting non-administrative terminals. The server then stores the first identifying information and/or second identifying information (the first and second identifying information have already been determined to be the same if the terminal was determined to be the administrative terminal) as authentication identifying information for the wireless network with the newly configured login password (which has been set by the administrative user to be the authentication code).

Furthermore, if the authentication identifying information for the wireless network and the login password associated with the wireless network are stored at the server, then the login password for the wireless network can be shared by the server with other terminals that submit a sharing request associated with the wireless network. Put another way, if an administrative terminal can be authenticated for a wireless network, then the sharing function of the login password to that wireless network is enabled at the server and therefore the login password for that wireless network can be shared with other terminals through the server.

After the wireless network is authenticated by the administrative terminal (e.g., the sharing function of the login password for the wireless network has been authorized at the server), a sharing request may be received from a non-administrative terminal. The sharing request requests for the login password of an authenticated wireless network. For example, if a sharing request associated with an authenticated wireless network is received from another terminal, then the server can send the stored login password for that wireless network to the other terminal.

For example, if a café owner had authenticated her terminal as an administrative terminal with respect to a wireless network that the café owner had configured to be used by café visitors, a café visitor can submit a sharing request for the café's wireless network through the visitor's own terminal.

Because the server has been authorized by the administrative terminal to share the login password of the wireless network, the server sends the login password stored with the authentication identifying information of that wireless network to the terminal that sent the sharing request. The terminal that sent the sharing request can then use the received login password associated with the wireless network to log on to the wireless network. Further details regarding processing a sharing request to an authenticated wireless network are described with FIG. 2, below.

As mentioned above, if the first identifying information does not match the second identifying information at 408 and/or the authentication code does not match the newly configured login password at 410, then the terminal that sent the authentication request is not authenticated as the administrative terminal and the server is not authorized to share the login password of the wireless network. Furthermore, the server would not respond to a sharing request from another terminal for the wireless network if the server were not authorized to share the login password of the wireless network. Put another way, a wireless network for which the server is not authorized to share the login password of thereof is considered to be private and therefore, the sharing function of the login password to that wireless network is not enabled at the server.

In various embodiments, some point after authenticating the wireless network (e.g., authorizing the sharing function of the login password to that wireless network at the server), the administrative terminal may disable the sharing function of the login password to the wireless network at the server. In some embodiments, the administrative terminal can disable the sharing function by changing the login password (e.g., through a user input to the administrative terminal) of the wireless network to one different from the login password stored by the server. By changing the login password of the wireless network but not updating the server of the new login password nor sending a new authentication request to receive a new authentication code from the server, the server will store an incorrect login password for the wireless network that even if shared with other terminals, will not permit the other terminals to successfully log in to the wireless network. In some embodiments, the administrative terminal can disable the sharing function by sending a discontinue request including identifying information associated with the wireless network to the server. In response to receiving the discontinue request, the server will delete the login password stored with an authenticating identifying information that matches the identifying information of the discontinue request. If the server were to receive a subsequent sharing request for the wireless network, the server would not be able to share the login password associated with that wireless network as it would no longer store such data.

Figure 5:
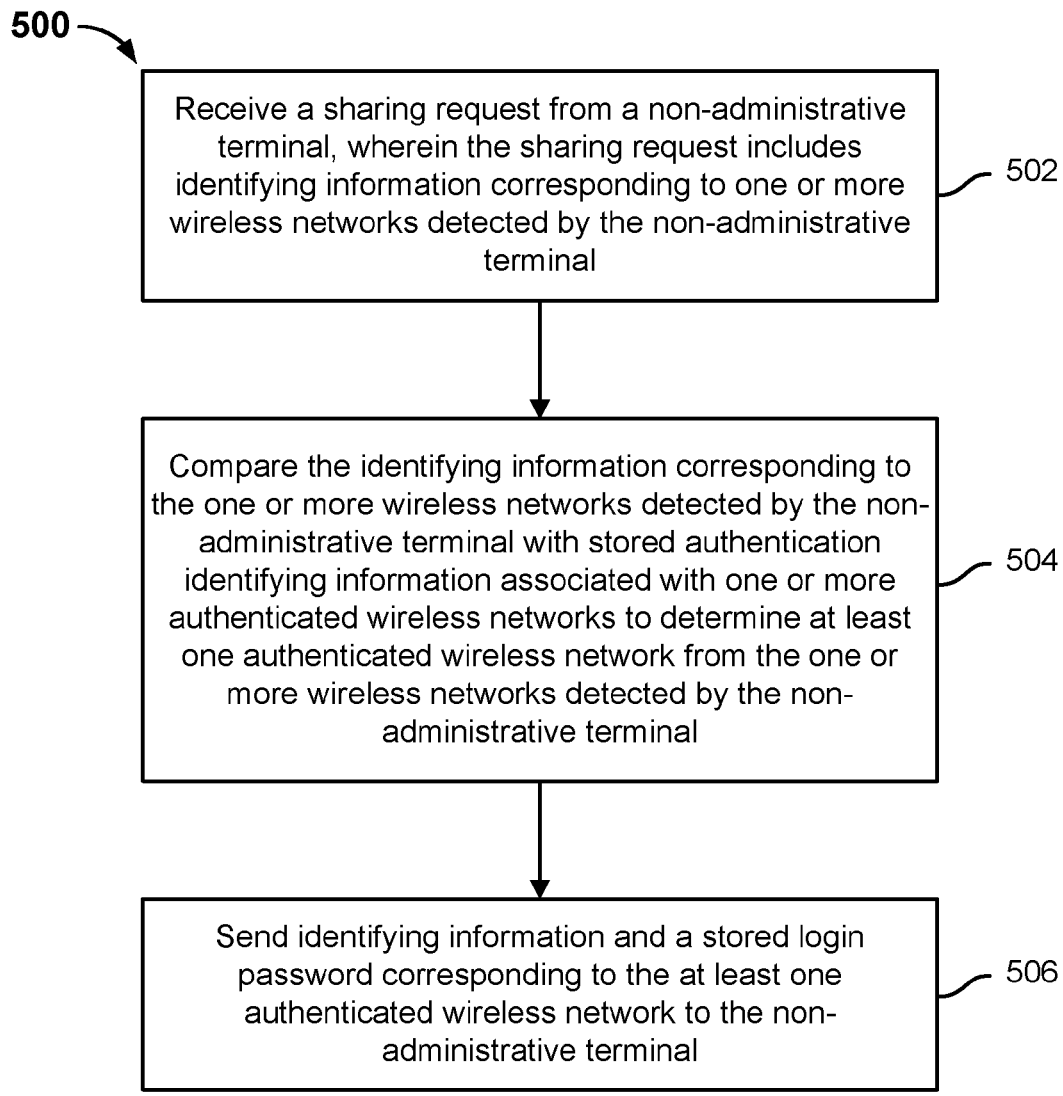
FIG. 5 is a flow diagram showing an embodiment of a process for processing a sharing request for a wireless network.

FIG. 5 is a flow diagram showing an embodiment of a process for processing a sharing request for a wireless network. In some embodiments, process 500 is implemented at the wireless network login password sharing server of system 100.

Process 500 describes a process of processing a sharing request from a non-administrative terminal for a login password of an authenticated wireless network. In various embodiments, a wireless network is authenticated using process 100 of FIG. 1, above.

At 502, a sharing request is received from a non-administrative terminal, wherein the sharing request includes identifying information corresponding to one or more wireless networks detected by the terminal.

A non-administrative user using a non-administrative terminal may seek to log in to a password-protected authenticated wireless network nearby to the non-administrative terminal's current geographic location. For example, the non-administrative user may comprise a user who is a visitor to an establishment/business that provides a password protected wireless network. While the non-administrative terminal used by the non-administrative user is capable of going online via a mobile (e.g., telecommunications) network, the user may want to avoid using the allotted data from his existing mobile data plan. To obtain access to a password-protected authenticated wireless network nearby, the non-administrative terminal first detects one or more wireless networks (e.g., using a WiFi adapter associated with the terminal). Then, the non-administrative terminal (e.g., an application associated with the wireless network login password sharing service and/or a web browser application executing on the terminal) generates a sharing request including the identifying information of each of the detected nearby wireless networks.

While the non-administrative terminal may detect one or more nearby wireless networks, not every such wireless network may be an authenticated wireless network so by sending the identifying information of the detected nearby wireless networks to the server, the server can confirm which, if any, of such wireless networks have been authenticated by a corresponding administrative terminal.

In some embodiments, the identifying information of each detected wireless network may comprise one or more combinations of the following: the name of the wireless network (SSID, Service Set Identifier), the physical location of the wireless router (MAC, Media Access Control) associated with the wireless network, or geographic location information (GPS, Global Positioning System) associated with the wireless network.

In some embodiments, assuming that the non-administrative terminal was not already connected to another WiFi network prior to generating the sharing request, then the non-administrative terminal can send the sharing request using a network other than a WiFi network. For example, the non-administrative terminal can send the sharing request using a mobile data network (e.g., a telecommunication network such as a 3G network or LTE network) to the wireless network login password sharing server.

At 504, the identifying information corresponding to the one or more wireless networks detected by the non-administrative terminal is compared with stored authentication identifying information associated with one or more authenticated wireless networks to determine at least one authenticated wireless network from the one or more wireless networks detected by the non-administrative terminal.

As described in process 100 of FIG. 1, above, authentication identifying information and login passwords corresponding to wireless networks that have been authenticated by administrative terminals have been stored at the server. Therefore, the identifying information of a wireless network detected by the non-administrative terminal that matches a set of authentication identifying information stored by the server corresponds to an authenticated wireless network and one for which the server is authorized to share the stored associated login password with the non-administrative terminal.

At 506, identifying information and a stored login password corresponding to the at least one authenticated wireless network is sent to the non-administrative terminal.

If the server determines one or more authenticated wireless networks among the wireless networks detected by the non-administrative terminal, then the identifying information as well as the login password corresponding to each such authenticated wireless network is sent back to the non-administrative terminal. If only one authenticated wireless network was determined from the wireless networks detected by the non-administrative terminal, the non-administrative terminal (e.g., an application executing at the terminal) can use the received login password to log in to the authenticated wireless network identified using the identifying information received from the server. If more than one authenticated wireless network were determined from the wireless networks detected by the non-administrative terminal, the non-administrative terminal (e.g., an application executing at the terminal) can select one of such authenticated wireless networks based on a predetermined set of criteria such as, for example, the signal strength of a wireless network, to log in to using the corresponding login password.

For example, assuming that the non-administrative terminal is still not connected to another WiFi network subsequent to sending the sharing request, the server can send the identifying information and the login password corresponding to the authenticated wireless network to the non-administrative terminal using a mobile data network (e.g., a telecommunication network such as a 3G network or LTE network).

In some embodiments, to add further security, the login password(s) received from the server are not viewable by the user of the non-administrative terminal. For example, while the non-administrative terminal can (temporarily) store such login passwords (e.g., using an application configured to receive and temporarily store the passwords), they will not be displayed to the user of the non-administrative terminal.

In some embodiments, if the non-administrative terminal is able to successfully log in to an authenticated wireless network using the login password received from the server, the non-administrative terminal can send to the server an indication associated with a successful login to the wireless network. However, if the non-administrative terminal is not able to successfully log in to an authenticated wireless network using the login password received from the server, the terminal can send an indication associated with a failed login to the wireless network using a mobile data network (e.g., a telecommunication network such as a 3G network or LTE network). The server can aggregate the number of successful login indications and failed login indications associated with each authenticated wireless network. In some embodiments, if the aggregated number of failed login indications associated with an authenticated wireless network exceeds a threshold number, then the server can send a notification to the administrative terminal associated with that authenticated wireless network such that the administrative user associated with the authenticated wireless network may investigate the failures. The following is an example application of managing sharing of the login password of a wireless network that comprises a WiFi network:

In this example application, the wireless network login password sharing server as described herein is a WiFi authentication information sharing server. The administrative terminal is associated with a café router and a non-administrative terminal can be any guest user terminal that desires to use WiFi in the café. In this example scenario, the café owner is an administrative user with respect to the WiFi network in the café because she has the credentials required to use the café router to change the login password of the WiFi network in the café. The following are example steps in a process by which the café owner can enable the sharing of the login password of the café's WiFi network with non-administrative terminals of visitors of the café.

Step 1: The WiFi authentication information sharing server receives an authentication request sent from an administrative terminal associated with the café owner. The WiFi authentication information sharing server extracts a first identifying information for the café's WiFi network from the authentication request and also generates an authentication code to send to the administrative terminal associated with the café owner. The café owner can then configure the new login password for the café's WiFi network to match the authentication code.

Step 2: Because the terminal associated with the café owner is an administrative terminal, the administrative terminal is able to cause the changing of the login password of the café's WiFi network from the previously configured login password to the authentication code. However, if the terminal had a non-administrative terminal, then it would not have been able to cause the change of the login password of the café's WiFi network.

Step 3: The WiFi authentication information sharing server receives a feedback response sent by the administrative terminal associated with the café owner and extracts the second identifying information and the newly configured login password for the café's WiFi network from the feedback response.

At this point, given that the terminal associated with the café owner is an administrative terminal, then the login password of the café's WiFi network in step 2 has already been changed to the authentication code. As such, the second identifying information for the café's WiFi network included in the feedback response sent by the administrative terminal will match the first identifying information for the café's WiFi network included in the authentication request sent by the administrative terminal. If the terminal had been a non-administrative user terminal, then the user would not have had the needed credentials to modify the login password in step 2. In addition, to prevent a non-administrative terminal from issuing a feedback response after switching to a different wireless network for which it does have the required credentials to modify the login password, it is determined whether the wireless network used by the terminal to send the feedback response is the same one that the terminal used to send the authentication request in step 1.

Step 4: The WiFi authentication information sharing server compares the first identifying information to the second identifying information and also compares the login password to the authentication code. If both comparisons result in matches, then the server confirms that the terminal associated with the café owner is an administrative terminal with respect to the café's WiFi network. If it is confirmed that the terminal is an administrative terminal with respect to the café's WiFi network, then the café's WiFi network is authenticated and its network login password is permitted to be shared.

Step 5: A non-administrative terminal associated with a café visitor scans for nearby wireless networks and thereby obtains the identifying information for the café's WiFi network among potentially identifying information for other nearby WiFi networks. The WiFi authentication information sharing server receives a sharing request including identifying information corresponding to the detected wireless networks from the non-administrative terminal associated with the café visitor over a network other than the café's WiFi network (because the WiFi terminal has not yet received a login password to the café's WiFi network). The WiFi authentication information sharing server determines the authenticated café WiFi network among the wireless network identified in the sharing request and sends the stored login password and the identifying information for the café WiFi network to the non-administrative terminal associated with the café visitor. The WiFi authentication information sharing server can send the stored login password and the identifying information for the café WiFi network to the terminal over a network other than the café's WiFi network (because the WiFi terminal has not yet received a login password to the café's WiFi network). The non-administrative terminal associated with the café visitor can then use the login password for the café's WiFi network to log in to the WiFi network created by the café routing equipment and performs operations online. As such, a guest user can receive the login password of a WiFi network when the WiFi's login password is permitted to be shared, and perform online operations through his or her cell phone, tablet, or other device that has a WiFi function.

Step 6: If after the non-administrative terminal receives the login password from the WiFi authentication information sharing server for the café's WiFi network but cannot log onto the current WiFi network, the non-administrative terminal can report the error to the server over a mobile data network (e.g., a telecommunications network such as a 3G network or LTE network). When the number of error reports aggregated by the server exceeds a threshold, the server determines that a problem has occurred on the WiFi network.

Step 7: In the event that the WiFi authentication information sharing server determines that a problem has occurred with respect to the café's WiFi network, the server can automatically discontinue sharing of the login password sharing service of the café's WiFi network with non-administrative terminals and instruct the administrative terminal of the café's WiFi network to troubleshoot the problems or re-issue an authentication request to carry out the sharing service. Or, after querying the administrative terminal of the WiFi network, the server may discontinue the login password sharing service for the café's WiFi network or keep the login password sharing service activated for the café's WiFi network.

In addition, when the owner of the café decides to discontinue sharing of the login password of the café's WiFi network, the owner of the café can use her administrative credentials to access an interface of the wireless router to change the wireless network login password and also input a selection into an application executing at the administrative terminal to send a discontinue request to the server. The server will use the identifying information of the café's WiFi network to locate and delete the corresponding login password that was saved on the server. After a discontinue request is received, the server will no longer share the login password for the café's WiFi network with non-administrative terminals.

Figure 6:
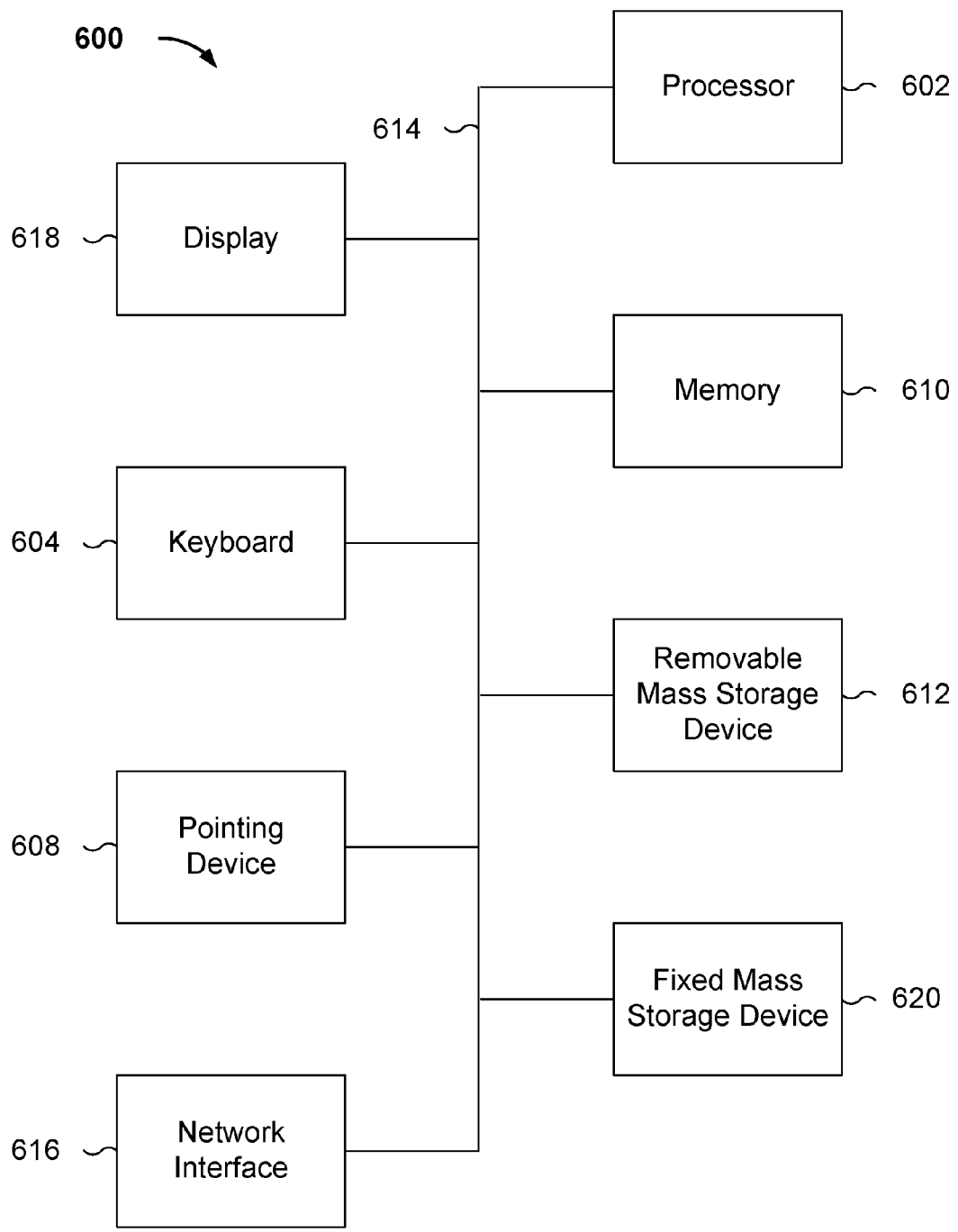
FIG. 6 is a functional diagram illustrating an embodiment of a programmed computer system for implementing the managing of sharing wireless network login passwords.

FIG. 6 is a functional diagram illustrating an embodiment of a programmed computer system for implementing the managing of sharing wireless network login passwords. As will be apparent, other computer system architectures and configurations can be used to determine manage sharing of wireless network login passwords. Computer system 600, which includes various subsystems as described below, includes at least one microprocessor subsystem (also referred to as a processor or a central processing unit (CPU)) 602. For example, processor 602 can be implemented by a single-chip processor or by multiple processors. In some embodiments, processor 602 is a general purpose digital processor that controls the operation of the computer system 600. Using instructions retrieved from memory 610, the processor 602 controls the reception and manipulation of input data, and the output and display of data on output devices (e.g., display 618). In some embodiments, processor 602 includes and/or is used to provide the management of sharing wireless network login passwords.

Processor 602 is coupled bi-directionally with memory 610, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also as is well known in the art, primary storage typically includes basic operating instructions, program code, data, and objects used by the processor 602 to perform its functions (e.g., programmed instructions). For example, memory 610 can include any suitable computer readable storage media, described below, depending on whether, for example, data access needs to be bi-directional or uni-directional. For example, processor 602 can also directly and very rapidly retrieve and store frequently needed data in a cache memory (not shown).

A removable mass storage device 612 provides additional data storage capacity for the computer system 600 and is coupled either bi-directionally (read/write) or uni-directionally (read only) to processor 602. For example, storage 612 can also include computer readable media such as magnetic tape, flash memory, PC-CARDS, portable mass storage devices, holographic storage devices, and other storage devices. A fixed mass storage 620 can also, for example, provide additional data storage capacity. The most common example of fixed mass storage 620 is a hard disk drive. Mass storage 612, 620 generally store additional programming instructions, data, and the like that typically are not in active use by the processor 602. It will be appreciated that the information retained within mass storages 612 and 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display 618, a network interface 616, a keyboard 604, and a pointing device 608, as well as an auxiliary input/output device interface, a sound card, speakers, and other subsystems as needed. For example, the pointing device 608 can be a mouse, stylus, track ball, or tablet, and is useful for interacting with a graphical user interface.

The network interface 616 allows processor 602 to be coupled to another computer, computer network, or telecommunications network using a network connection as shown. For example, through the network interface 616, the processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow the processor 602 to send and, more typically, receive data from other devices such as microphones, touch-sensitive displays, transducer card readers, tape readers, voice or handwriting recognizers, biometrics readers, cameras, portable mass storage devices, and other computers.

In some embodiments, computing equipment comprises one or more processors (CPUs), input/output interfaces, network interfaces, and memory. Memory may include such forms as volatile storage devices in computer-readable media, random access memory (RAM) and/or non-volatile memory, such as read-only memory (ROM) or flash memory (flash RAM). Memory is an example of a computer-readable medium.

Computer-readable media, including permanent and non-permanent media and removable and non-removable media, may achieve information storage by any technique or technology. Information can be computer-readable commands, data structures, program modules, or other data. Examples of computer storage media include but are not limited to phase-change memory (PRAM), static random access memory (SRAM), dynamic random access memory (DRAM), other types of random access memory, read-only memory (ROM), electrically erasable programmable read-only memory (EEPROM), flash memory, or other memory technology, CD-ROM, digital multifunction disc (DVD) or other optical storage, magnetic cassettes, magnetic tape or magnetic disc memory, or other magnetic storage equipment or any other non-transmission media that can be used to store information that is accessible to computers. As defined in this document, computer-readable media does not include transitory computer-readable media, such as modulated data signals and carrier waves. Embodiments of managing sharing of wireless network login passwords as described herein can ensure that the WiFi names and passwords of wireless network providers are not submitted by ordinary users to other users for unrestricted sharing.

Embodiments of managing sharing of wireless network login passwords provides sharing convenience of the WiFi names and passwords of wireless network providers while ensuring their security.

A person skilled in the art should understand that the embodiments of the present application can be provided as methods, devices, or computer software products. Therefore, the present application may take the form of complete hardware embodiments, complete software embodiments, or embodiments that combine software and hardware. In addition, the present application can take the form of computer program products implemented on one or more computer-operable storage media (including but not limited to magnetic disk storage devices, CD-ROMs, and optical storage devices) containing computer operable program codes.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
one or more computer processors configured to:
  determine whether a first terminal is an administrative terminal associated with a wireless network that the first terminal is currently using based at least in part on:
    a first determination of whether a feedback response from the first terminal includes a newly configured login password that matches an authentication code that was previously sent to the first terminal, and
    a second determination of whether the feedback response from the first terminal includes a first identifying information associated with the wireless network that matches a previously received second identifying information associated with the wireless network;
  wherein in the event that the first terminal is determined to be the administrative terminal associated with the wireless network:
    store at least one of the first identifying information or the second identifying information with the newly configured login password associated with the wireless network; and
    determine that the wireless network that is currently used by the first terminal comprises an authenticated wireless network to include in one or more authenticated wireless networks and that the newly configured login password is configured to be shareable;
  wherein in the event that the first terminal is not determined to be the administrative terminal associated with the wireless network:
    determine that the wireless network that is currently used by the first terminal is not the authenticated wireless network and that the newly configured login password associated with the wireless network is not shareable;
  receive a sharing request from a second terminal, wherein the sharing request includes identifying information corresponding to one or more wireless networks detected by the second terminal;
  compare the identifying information corresponding to the one or more wireless networks detected by the second terminal to stored authentication identifying information associated with one or more authenticated wireless networks to determine at least one authenticated wireless network from the one or more wireless networks detected by the second terminal; and send identifying information and a stored login password corresponding to the at least one authenticated wireless network to the second terminal; and one or more memories coupled to the one or more computer processors and configured to provide the one or more computer processors with instructions.

2. The system of claim 1, wherein the one or more computer processors are further configured to:

receive from the first terminal an authentication request to authenticate the wireless network that is currently used by the first terminal, wherein the authentication request includes the second identifying information associated with the wireless network that is currently used by the first terminal;

send the authentication code to the first terminal;

receive the feedback response from the first terminal, wherein the feedback response includes the first identifying information associated with the wireless network and the newly configured login password associated with the wireless network currently used by the first terminal;

compare the first identifying information to the second identifying information; and compare the authentication code to the newly configured login password.

3. The system of claim 1, wherein the one or more computer processors are further configured to:

receive from the first terminal an authentication request to authenticate the wireless network that is currently used by the first terminal, wherein the authentication request includes the second identifying information associated with the wireless network that is currently used by the first terminal;

send the authentication code to the first terminal;

receive the feedback response from the first terminal, wherein the feedback response includes the first identifying information associated with the wireless network and the newly configured login password associated with the wireless network currently used by the first terminal;

compare the first identifying information to the second identifying information; and compare the authentication code to the newly configured login password, wherein in the event that the first identifying information matches the second identifying information and the authentication code matches the newly configured login password:

determine that the first terminal is the administrative terminal associated with the wireless network that is currently used by the first terminal; and in response to the determination that the first terminal comprises the administrative terminal associated with the wireless network that is currently used by the first terminal, store at least one of the first identifying information and the second identifying information as the authentication identifying information with the newly configured login password.

4. The system of claim 1, wherein the one or more computer processors are further configured to:

receive from the first terminal an authentication request to authenticate the wireless network that is currently used by the first terminal, wherein the authentication request includes the second identifying information associated with the wireless network that is currently used by the first terminal;

generate the authentication code;

send the authentication code to the first terminal;

receive the feedback response from the first terminal, wherein the feedback response includes the first identifying information associated with the wireless network and the newly configured login password associated with the wireless network currently used by the first terminal;

compare the first identifying information to the second identifying information; and compare the authentication code to the newly configured login password.

5. The system of claim 1, wherein the one or more computer processors are further configured to:

receive from the first terminal an authentication request to authenticate the wireless network that is currently used by the first terminal, wherein the authentication request includes the second identifying information associated with the wireless network that is currently used by the first terminal;

send the authentication code to the first terminal;

receive the feedback response from the first terminal, wherein the feedback response includes the first identifying information associated with the wireless network and the newly configured login password associated with the wireless network currently used by the first terminal;

compare the first identifying information to the second identifying information; and compare the authentication code to the newly configured login password, wherein in the event that either one or both of the first identifying information does not match the second identifying information and the authentication code does not match the newly configured login password, determine that the first terminal is not the administrative terminal associated with the wireless network that is currently used by the first terminal.

6. The system of claim 1, wherein the one or more computer processors are further configured to:

receive from the first terminal an authentication request to authenticate the wireless network that is currently used by the first terminal, wherein the authentication request includes the second identifying information associated with the wireless network that is currently used by the first terminal;

send the authentication code to the first terminal;

receive the feedback response from the first terminal, wherein the feedback response includes the first identifying information associated with the wireless network and the newly configured login password associated with the wireless network currently used by the first terminal;

compare the first identifying information to the second identifying information;

compare the authentication code to the newly configured login password;

receive a discontinue request associated with the wireless network that is currently used by the first terminal from the first terminal; and in response to the discontinue request, delete the newly configured login password stored with the authentication identifying information.

7. The system of claim 1, wherein the first identifying information comprises one or more of the following: a name of the wireless network, a physical location of a wireless router associated with the wireless network, and geographic location information associated with the wireless network.

8. The system of claim 1, wherein the sharing request from the second terminal is received over a network that is not one of the one or more wireless networks detected by the second terminal.

9. The system of claim 1, wherein the one or more computer processors are further configured to:
receive an indication associated with a failed login from the second terminal; and
determine an aggregate number of failed logins associated with the at least one authenticated wireless network based at least in part on the received indication associated with the failed login from the second terminal.

10. A method, comprising:
determining whether a first terminal is an administrative terminal associated with a wireless network that the first terminal is currently using based at least in part on:
a first determination of whether a feedback response from the first terminal includes a newly configured login password that matches an authentication code that was previously sent to the first terminal, and
a second determination of whether the feedback response from the first terminal includes a first identifying information associated with the wireless network that matches a previously received second identifying information associated with the wireless network;
wherein in the event that the first terminal is determined to be the administrative terminal associated with the wireless network:
storing at least one of the first identifying information or the second identifying information with the newly configured login password associated with the wireless network; and
determining that the wireless network that is currently used by the first terminal comprises an authenticated wireless network to include in one or more authenticated wireless networks and that the newly configured login password is configured to be shareable;
wherein in the event that the first terminal is not determined to be the administrative terminal associated with the wireless network:
determining that the wireless network that is currently used by the first terminal is not the authenticated wireless network and that the newly configured login password associated with the wireless network is not shareable;
receiving a sharing request from a second terminal, wherein the sharing request includes identifying information corresponding to one or more wireless networks detected by the second terminal;
comparing the identifying information corresponding to the one or more wireless networks detected by the second terminal to stored authentication identifying information associated with one or more authenticated wireless networks to determine at least one authenticated wireless network from the one or more wireless networks detected by the second terminal; and
sending identifying information and a stored login password corresponding to the at least one authenticated wireless network to the second terminal.

11. The method of claim 10, further comprising:
receiving from the first terminal an authentication request to authenticate the wireless network that is currently used by the first terminal, wherein the authentication request includes the second identifying information associated with the wireless network that is currently used by the first terminal;
sending the authentication code to the first terminal;
receiving the feedback response from the first terminal, wherein the feedback response includes the first identifying information associated with the wireless network and the newly configured login password associated with the wireless network currently used by the first terminal;
comparing the first identifying information to the second identifying information; and
comparing the authentication code to the newly configured login password.

12. The method of claim 10, further comprising:
receiving from the first terminal an authentication request to authenticate the wireless network that is currently used by the first terminal, wherein the authentication request includes the second identifying information associated with the wireless network that is currently used by the first terminal;
sending the authentication code to the first terminal;
receiving the feedback response from the first terminal, wherein the feedback response includes the first identifying information associated with the wireless network and the newly configured login password associated with the wireless network currently used by the first terminal;
comparing the first identifying information to the second identifying information; and
comparing the authentication code to the newly configured login password,
wherein in the event that the first identifying information matches the second identifying information and the authentication code matches the newly configured login password:
determining that the first terminal is the administrative terminal associated with the wireless network that is currently used by the first terminal; and
in response to the determination that the first terminal comprises the administrative terminal associated with the wireless network that is currently used by the first terminal, storing at least one of the first identifying information and the second identifying information as the authentication identifying information with the newly configured login password.

13. The method of claim 10, further comprising:
receiving from the first terminal an authentication request to authenticate the wireless network that is currently used by the first terminal, wherein the authentication request includes the second identifying information associated with the wireless network that is currently used by the first terminal;
generating the authentication code;
sending the authentication code to the first terminal;
receiving the feedback response from the first terminal, wherein the feedback response includes the first identifying information associated with the wireless network and the newly configured login password associated with the wireless network currently used by the first terminal;
comparing the first identifying information to the second identifying information; and
comparing the authentication code to the newly configured login password.

14. The method of claim 10, further comprising:
receiving from the first terminal an authentication request to authenticate the wireless network that is currently used by the first terminal, wherein the authentication request includes the second identifying information associated with the wireless network that is currently used by the first terminal;

sending the authentication code to the first terminal;

receiving the feedback response from the first terminal, wherein the feedback response includes the first identifying information associated with the wireless network and the newly configured login password associated with the wireless network currently used by the first terminal;

comparing the first identifying information to the second identifying information; and comparing the authentication code to the newly configured login password, wherein in the event that either one or both of the first identifying information does not match the second identifying information and the authentication code does not match the newly configured login password, determining that the first terminal is not the administrative terminal associated with the wireless network that is currently used by the first terminal.

15. The method of claim 10, further comprising:

receiving from the first terminal an authentication request to authenticate the wireless network that is currently used by the first terminal, wherein the authentication request includes the second identifying information associated with the wireless network that is currently used by the first terminal;

sending the authentication code to the first terminal;

receiving the feedback response from the first terminal, wherein the feedback response includes the first identifying information associated with the wireless network and the newly configured login password associated with the wireless network currently used by the first terminal;

comparing the first identifying information to the second identifying information;

comparing the authentication code to the newly configured login password;

receiving a discontinue request associated with the wireless network that is currently used by the first terminal from the first terminal; and in response to the discontinue request, deleting the newly configured login password stored with the authentication identifying information.

16. A non-transitory computer readable storage medium comprising computer instructions for:

determining whether a first terminal is an administrative terminal associated with a wireless network that the first terminal is currently using based at least in part on:
  a first determination of whether a feedback response from the first terminal includes a newly configured login password that matches an authentication code that was previously sent to the first terminal, and
  a second determination of whether the feedback response from the first terminal includes a first identifying information associated with the wireless network that matches a previously received second identifying information associated with the wireless network;

wherein in the event that the first terminal is determined to be the administrative terminal associated with the wireless network:
  storing at least one of the first identifying information or the second identifying information with the newly configured login password associated with the wireless network; and
  determining that the wireless network that is currently used by the first terminal comprises an authenticated wireless network to include in one or more authenticated wireless networks and that the newly configured login password is configured to be shareable;

wherein in the event that the first terminal is not determined to be the administrative terminal associated with the wireless network:
  determining that the wireless network that is currently used by the first terminal is not the authenticated wireless network and that the newly configured login password associated with the wireless network is not shareable;

receiving a sharing request from a second terminal, wherein the sharing request includes identifying information corresponding to one or more wireless networks detected by the second terminal;

comparing the identifying information corresponding to the one or more wireless networks detected by the second terminal to stored authentication identifying information associated with one or more authenticated wireless networks to determine at least one authenticated wireless network from the one or more wireless networks detected by the second terminal; and sending identifying information and a stored login password corresponding to the at least one authenticated wireless network to the second terminal.

* * * * *